(12) United States Patent
Calcev et al.

(10) Patent No.: US 9,736,702 B2
(45) Date of Patent: Aug. 15, 2017

(54) SYSTEM AND METHOD FOR QUALITY OF SERVICE CONTROL

(71) Applicant: FutureWei Technologies, Inc., Plano, TX (US)

(72) Inventors: George Calcev, Hoffman Estates, IL (US); Bin Chen, Schaumburg, IL (US); Lin Cai, Schaumburg, IL (US); Lukasz Krzymien, Rolling Meadows, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 125 days.

(21) Appl. No.: 13/740,866

(22) Filed: Jan. 14, 2013

(65) Prior Publication Data

US 2013/0182592 A1    Jul. 18, 2013

Related U.S. Application Data

(60) Provisional application No. 61/585,977, filed on Jan. 12, 2012.

(51) Int. Cl.
*H04W 24/00* (2009.01)
*H04W 24/10* (2009.01)
*H04W 24/08* (2009.01)

(52) U.S. Cl.
CPC ............ *H04W 24/00* (2013.01); *H04W 24/10* (2013.01); *H04W 24/08* (2013.01)

(58) Field of Classification Search
CPC ....... H04B 7/212; H04B 17/00; H04W 24/00; H04J 1/00
See application file for complete search history.

(56) References Cited

U.S. PATENT DOCUMENTS

| | | | | |
|---|---|---|---|---|
| 2004/0092275 A1* | 5/2004 | Krasner | .................. | G01S 11/08 455/502 |
| 2008/0253314 A1 | 10/2008 | Stephenson et al. | | |
| 2008/0304448 A1 | 12/2008 | Hosein | | |
| 2009/0028091 A1* | 1/2009 | Dimou | .......................... | 370/328 |
| 2009/0122711 A1 | 5/2009 | Soomro et al. | | |
| 2009/0137262 A1* | 5/2009 | Willenegger et al. | ........ | 455/515 |

(Continued)

FOREIGN PATENT DOCUMENTS

| | | |
|---|---|---|
| CN | 101854268 A | 10/2010 |
| CN | 101977423 A | 2/2011 |
| WO | 2011097762 A1 | 8/2011 |

OTHER PUBLICATIONS

International Search Report and Written Opinion of Patent Cooperation Treaty (PCT), International Application No. PCT/US2013/021459, Applicant Huawei Technologies Co., Ltd., date of mailing Apr. 2, 2013, 9 pages.

(Continued)

*Primary Examiner* — Anez Ebrahim
(74) *Attorney, Agent, or Firm* — Slater Matsil, LLP

(57) ABSTRACT

A method for measuring delay in a wireless fidelity (WiFi) network includes measuring a delay associated with transmission of a packet through the WiFi network in response to a measurement request from a requesting device, and contending for access to a communications channel of the WiFi network after measurement of the delay. The method also includes transmitting the delay as measured to the access point using the communications channel after a successful contention.

27 Claims, 7 Drawing Sheets

(56) References Cited

U.S. PATENT DOCUMENTS

| | | | |
|---|---|---|---|
| 2009/0208091 A1 | 8/2009 | Hayakawa et al. | |
| 2011/0170463 A1* | 7/2011 | Aryan et al. | 370/281 |
| 2012/0026869 A1 | 2/2012 | Wang et al. | |
| 2012/0311043 A1* | 12/2012 | Chen et al. | 709/204 |

OTHER PUBLICATIONS

"IEEE Standard for Information Technology—Telecommunications and information exchange between systems—Local and metropolitan area networks—Specific Requirements, Part 11: Wireless LAN Medium Access Control (MAC) and Physical Layer (PHY) Specifications," IEEE Draft P802.11-REVmb™/D12, Prepared by the Working Group of the LAN/MAN Standards Committee of the IEEE Computer Society, IEEE Standards Activities Department, Nov. 2011, Sections: 8.4.2.41, 8.4.2.46, 8.3.3.2 and 8.3.3.10, pp. 463-467, 474-477, 636-637 and 640-641.

Chinese Office Action received in Application No. 201380004904.5 mailed Apr. 3, 2015, 6 pages.

Chinese Search Report received in Application No. 2013800049045 mailed Mar. 26, 2015, 2 pages.

Second Chinese Office Action received in Application No. 201380004904.5 mailed Nov. 4, 2015, 6 pages.

\* cited by examiner

SYSTEM AND METHOD FOR QUALITY OF SERVICE CONTROL

This application claims the benefit of U.S. Provisional Application No. 61/585,977, filed on Jan. 12, 2012, entitled "Systems and Methods for Quality of Service Control in Wireless Communications," which application is hereby incorporated herein by reference.

TECHNICAL FIELD

The present disclosure relates generally to digital communications, and more particularly to a system and method for quality of service control.

BACKGROUND

In an IEEE 802.11 compliant communications system (also known as WiFi), an access point (AP) serves one or more stations (STA) by receiving transmissions from the one or more STA and forwarding the transmissions to their intended destinations. Similarly, the AP receives a transmission intended for one of its STA and forwards the transmission to the STA. A transmission occurs over unidirectional channels referred to as communications links. A transmission from a STA to the AP may be referred as an uplink (UL) transmission, while a transmission from the AP to a STA may be referred to as a downlink (DL) transmission.

WiFi's air interface includes the physical (PHY) and media access control (MAC) layers. In IEEE 802.11, the communication channel is shared by stations under a mechanism called distributed channel access (DCA) with a function called distributed coordination function (DCF), which uses a carrier sense multiple access with collision avoidance (CSMA/CA) mechanism. The DCF uses both physical and virtual carrier sense functions to determine the state of the communication channel. The physical carrier sense resides in the PHY and uses the energy detection or the preamble detection with frame length deferral when it determines that the communication channel is busy. In this disclosure the term preamble or the PHY preamble is used to identify that portion of the transmission at lower rate and usually generated at the PHY layer. The data part of the transmission it usually comes from the higher layers such as the MAC, Internet Protocol (IP), and/or session layers. The virtual carrier sense resides in the MAC and it uses reservation information carried in the Duration field of the MAC packet headers announcing the duration of packet transmission and packet acknowledgment over the communication channel. The virtual carrier sense mechanism is called the network allocation vector (NAV). The communication channel is determined to be idle only when both the physical and virtual carrier sense mechanisms indicate it to be so.

A STA with a data frame for transmission first performs a clear channel assessment (CCA) by sensing the communication channel for a fixed duration, commonly referred to as the DCF inter-frame space (DIFS). If the communication channel is busy, the station waits until the communication channel becomes idle, defers for a DIFS, and then waits for a further random backoff period. The backoff timer decreases by one for every idle slot and freezes when the communication channel is sensed busy. When the backoff timer reaches zero, the station starts data transmission. The communication channel access procedure is shown in FIG. 1.

IEEE 802.11 has recently launched the task group TGah, which is designed to support sensor/smart meters applications, as well as backhaul and cellular offloading for under 1 GHz. TGah will follow the IEEE 802.11 basic protocol with the support of larger coverage areas, on the order of 1 kilometers or more. Therefore, issues related to larger coverage areas should be addressed.

SUMMARY OF THE DISCLOSURE

Example embodiments of the present disclosure which provide a system and method for quality of service control.

In accordance with an example embodiment of the present disclosure, a method for measuring delay in a wireless fidelity (WiFi) network is provided. The method included measuring, by a measuring station, a delay associated with transmission of a packet through the WiFi network in response to a measurement request from a requesting device, and contending, by the measuring station, for access to a communications channel of the WiFi network after measurement of the delay. The method further comprises transmitting, by the measuring station, the delay as measured to the requesting device using the communications channel after a successful contention.

In accordance with another example embodiment of the present disclosure, a method for requesting a delay measurement in a wireless fidelity (WiFi) network is provided. The method includes transmitting, by a requesting device, a request to a measuring station, the request for a measurement of a delay associated with a transmission of a packet by the measuring station, and receiving, by the requesting device, a measured delay from the measuring station. The method also includes operating, by the requesting device, responsive to the measured delay.

In accordance with another example embodiment of the present disclosure, a measuring station is provided. The measuring station includes a processor, and a transmitter operatively coupled to the processor. The processor measures a delay associated with transmission of a packet through a wireless fidelity (WiFi) network in response to a measurement request from a requesting device, and contends for access to a communications channel of the WiFi network after measurement of the delay. The transmitter transmits the delay as measured to the requesting device using the communications channel after a successful contention.

In accordance with another example embodiment of the present disclosure, a requesting device is provided. The requesting device includes a transmitter, a receiver, and a processor operatively coupled to the transmitter and to the receiver. The transmitter transmits a request to a measuring station, the request for a measurement of a delay associated with a transmission of a packet by the measuring station. The receiver receives a measured delay from the measuring station. The processor operates responsive to the measured delay.

One advantage of an embodiment is that a quality of service (QoS) entity making QoS decisions has good delay measurement information from a wide range of sources that it can use to make QoS decisions.

Yet another advantage of an embodiment is that the delay measurement information captures the individual experience of various sources, thereby providing a localized picture of channel access situation for the various sources.

A further advantage of an embodiment is that overhead associated with making delay measurements is distributed over a large number measurement devices, which helps to reduce the computational load on a centralized measurement entity making delay measurements.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

Figure 1:
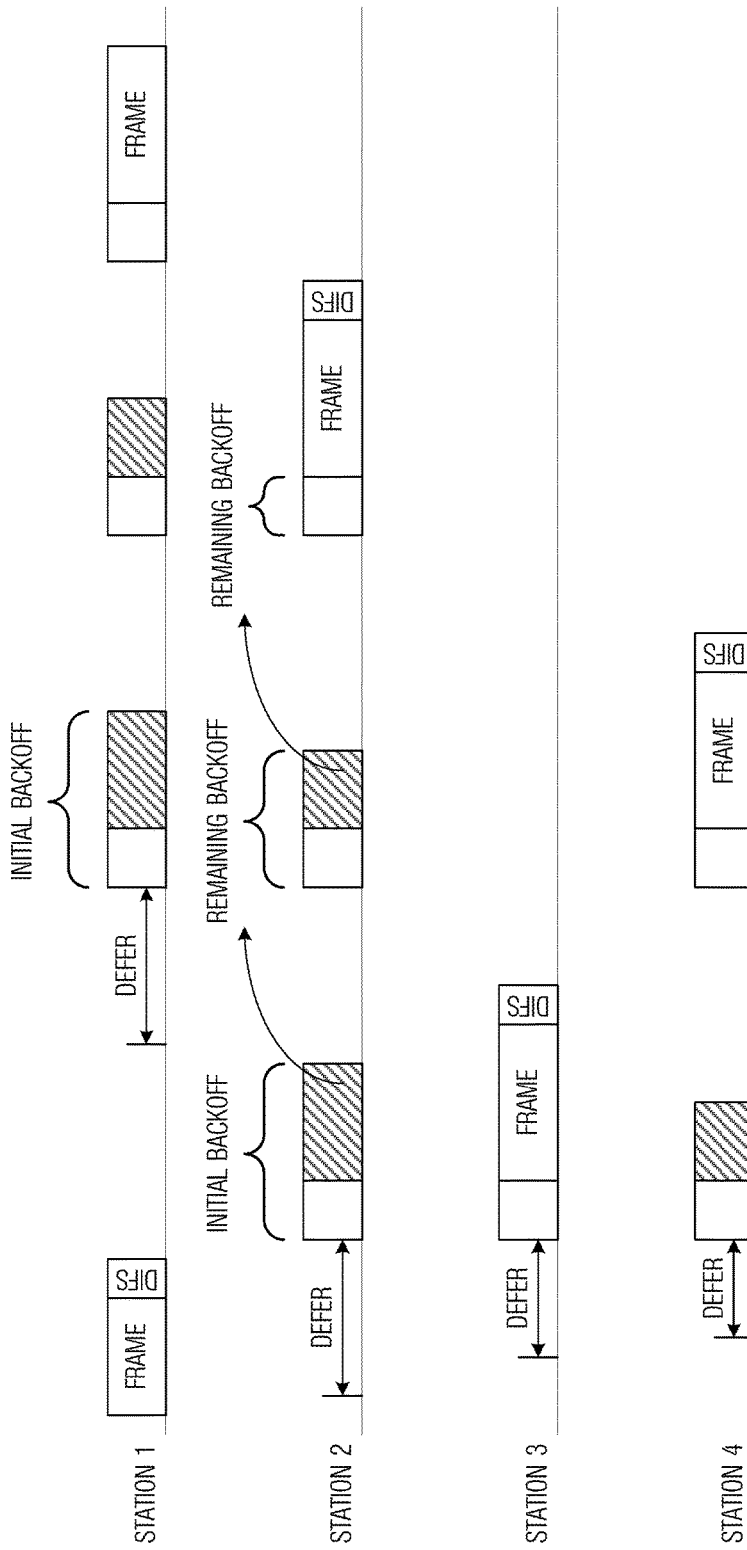
FIG. 1 illustrates a prior art communications channel access procedure.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to quality of service control. For example, at a measuring station, the measuring station measures a delay associated with transmission of a packet through the WiFi network in response to a measurement request from a requesting device, contends for access to a communications channel of the WiFi network, and transmits the delay as measured to the requesting device using the communications channel after a successful contention. As another example, at a requesting station, the requesting station transmits a request to a measuring station, the request for a measurement of a delay associated with a transmission of a packet by the measuring station, receives a measured delay from the measuring station, and operates responsive to the measured delay.

In another example, the requesting station, such an access point, may request a summary of the delay for all packets over a period of time, or for a specific subset of packets, such as a particular data flow over specified time duration. In another example, the requesting station may ask for reports of the delay only when the delay experienced by the measuring station is above or below some threshold.

The present disclosure will be described with respect to example embodiments in a specific context, namely an IEEE 802.11 compliant communications system supporting QoS. The disclosure may also be applied, however, to other standards compliant and non-standards compliant communications systems that support QoS, such as CSMA/CA, cellular, and the like, communications systems.

In WiFi, a QoS control mechanism is employed, which is called enhanced distributed channel access (EDCA). In EDCA, four access categories (ACs) are defined, and each AC is characterized by specific values for a set of access parameters that statistically prioritize channel access for one AC over another. The 4 ACs are AC_VO (the highest priority for voice traffic), AC_VI (the second highest priority for video traffic), AC_BE (the third highest priority for best effort traffic), and AC_BK (the lowest priority for background traffic).

There are other wireless communication systems, for example 3GPP LTE/WCDMA, and 3GPP2 CDMA, which generally are known as cellular systems, using different radio access mechanisms than WiFi. In a cellular system, there is a central controller, called a base station (BS), a controller, a NodeB, an evolved NodeB, and the like, which controls all the radio resources for each mobile station (MS), also commonly referred to as a mobile, subscriber, user, terminal, User Equipment, and the like. An MS requests resources and the BS allocates for them, while in WiFi the stations compete with one another for resources, but the MS still contends for the transmission of resource requirements.

A wireless communication system generally defines a QoS restriction to support traffic transmission. QoS restrictions generally include several parameters about transmission capacity or requirements, for example, transmission delay, lowest bandwidth requirement, delay jitter, and the like. For different types of traffic, the parameters of the QoS restrictions are different, for example, voice traffic needs low transmission delay with low bandwidth request, while file download (e.g., file transfer protocol (FTP)) traffic needs a high bandwidth request, but without a critical delay requirement.

QoS restrictions may be affected by one or more factors in a communication system. Such factors include, in a WiFi system: channel unavailability (due to factors such as WiFi transmissions, and non-WiFi interference, for example); packet loss (a packet transmission that had channel free conditions when it started but the transmitter did not receive an acknowledgement, a collision due to hidden node problem, packet loss due to the channel fading, packet loss due to the interference from non-WiFi devices, and the like); WiFi devices defer their channel access when a channel is sensed busy, which further increases access delay; and WiFi devices double the backoff window and retransmit when they encounter a packet loss. These factors and others cause additional transmission delay.

In current generation WiFi communications systems, the communications channel may be busy and collisions occur when many stations contend for the communications channel. This scenario may be referred to as channel congestion. An access point may be able to detect a busy communications channel by sensing the channel, but it typically cannot detect collisions nor forecast it. It may be possible for the access point to request measurements of the channel, e.g., channel state information, signal to noise ratio, signal to interference plus noise ratio, and the like, from the stations to assist it in its operations. However, the requests and the responses may add to the overhead and further burden access to the communications channel.

Since the access point generally cannot estimate the exact conditions of the communications channel by simply sensing the communications channel, it typically will be unable to infer if QoS restrictions are satisfied for a particular data flow or connection. As an example, a station experiences local congestion due to an overlapping base station subsystem or due to a local interferer, but the access point is not able to sense a high level of energy due to being relatively far removed from the station. As another example, the station may appear as a hidden node to the access point, which leads to collisions. Usually, the access point is unable to detect these and similar situations. It is noted that in a cellular communications system, mobile stations also need to contend for the transmission of resource requirement, which has problems similar to those described herein.

Figure 2:
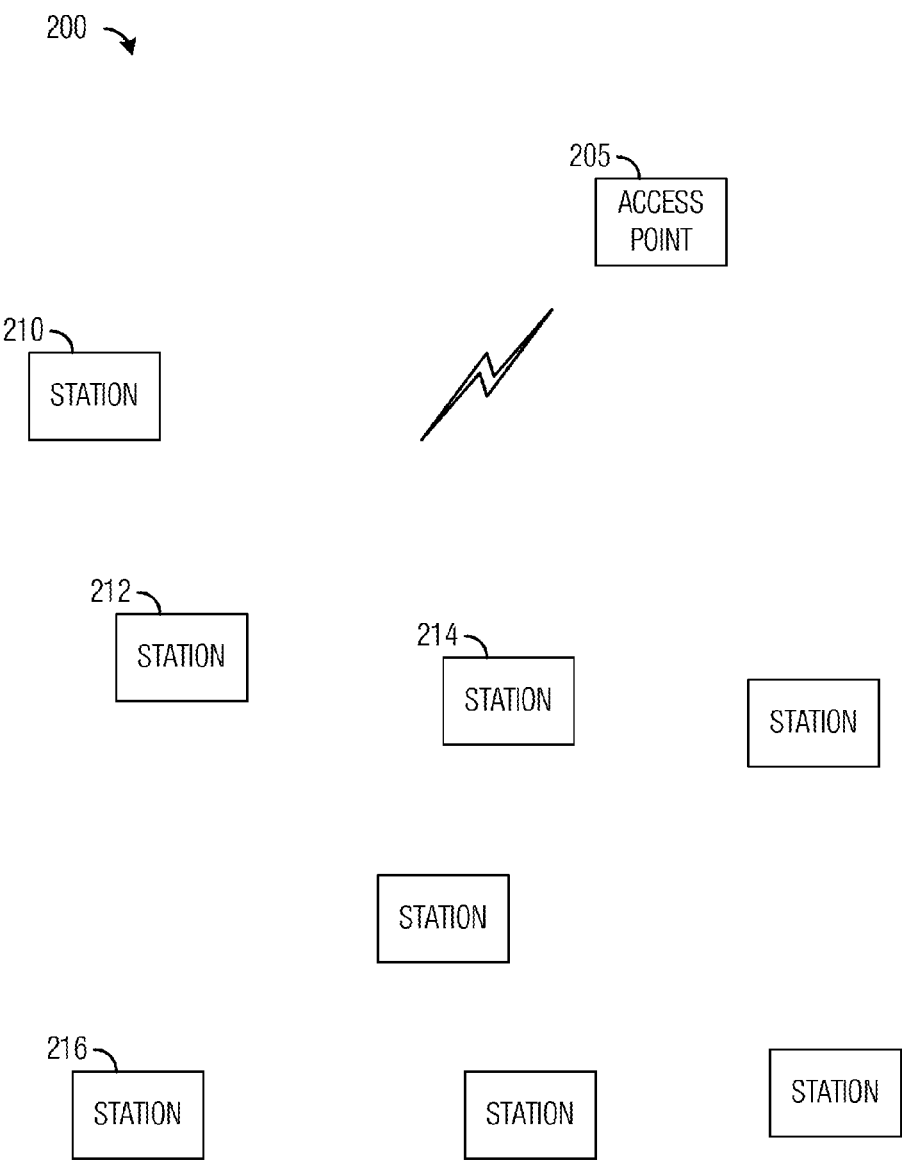
FIG. 2 illustrates an example communications system according to example embodiments described herein.

FIG. 2 illustrates a communications system 200. Communications system 200 includes an AP 205 that serves a plurality of stations, such as station 210, station 212, station 214, and station 216. Examples of stations may include a computer with WiFi connectivity, a personal digital assistant, a cellular telephone, a smart device with WiFi capability (such as a printer, a television, a media server, a media player, a camera, an appliance (including a refrigerator, an oven, and the like), an automobile, a sensor device, and the like). In general, the stations served by AP 205 may be referred to as non-access point stations. Communications within communications system 200 may take place between AP 205 and a station, such as station 210, station 212, station 214, and station 216. Communications may also take place between a pair of stations. While it is understood that communications systems may employ multiple APs capable of communicating with a number of stations, only a limited number of APs and stations are illustrated for simplicity.

As discussed previously, as the coverage area of an access point, such as access point 205, gets larger, it may become more difficult for the access point to accurately detect events occurring at stations throughout its coverage area. As an example, the access point may be able to detect events occurring at stations that are closely located to the access point, while the access point may not be able to detect events occurring at stations that are remotely located from the access point. In fact, the access point may not be able to detect some stations at all. Therefore, there is a need for a technique that allows the access point to obtain accurate information about network condition throughout its coverage area. Another factor that may impact the ability of the access point to detect events or make measurements if they are performed in a centralized manner is traffic asymmetry. As an example, some devices such as smart phones could have more downlink data, therefore the measurements made by the access point may be accurate since the access point could measure the packet delays in its own transmission queue. However, for a situation when there is more uplink data than downlink data, such as in sensor networks or with machine to machine communication, the access point measurements may be limited (due to the small number of transmissions made by the access point to the sensors and/or machine to machine devices) and may be affected by an inherent variation in the delay, which generally is a stochastic variable.

According to an example embodiment, the access point may make use of stations in its coverage area detect network condition and then have the stations report the network condition to the access point. It is noted that although the discussion focuses on the stations reporting the network condition to the access point, the stations may report the network conditions to one or more peer stations, one or more network entities that processes the network conditions reported by the stations, one or more access points, and the like.

According to an example embodiment, the network condition that is detected (e.g., measured) by the stations is a delay, such as a packet delay. The delay may provide an indication of network condition of a portion of the communications system that includes the station that is reporting the network condition. If the delay is reported by stations that are distributed throughout the communications system, an accurate picture of the network condition of the communications system may be derived. The delay may be used by the access point (or peer station, network entity, and the like) to set, adjust, or delete QoS restrictions.

According to an example embodiment, the QoS restrictions include admission control which regulates the addition and/or deletion of stations in the communications system in accordance with the network condition. QoS restrictions also include load balancing involving adjusting connection number, connection bandwidth, connection type, and the like, in different portions of the communications system in accordance with the network condition to balance the network condition in the communications system. As an example, QoS restrictions may be configured so that a first portion of the communications system with poor network condition may not accept new stations, reduce existing stations, lower connection number, reduce connection bandwidth, and the like, to improve the network condition in the first portion of the communications system. Similarly, QoS restrictions may be configured so that a second portion of the communications system with good network condition may accept new stations, increase existing stations, increase connection number, increase connection bandwidth, and the like to increase the stations supported in the second portion of the communications system.

Figure 3A:
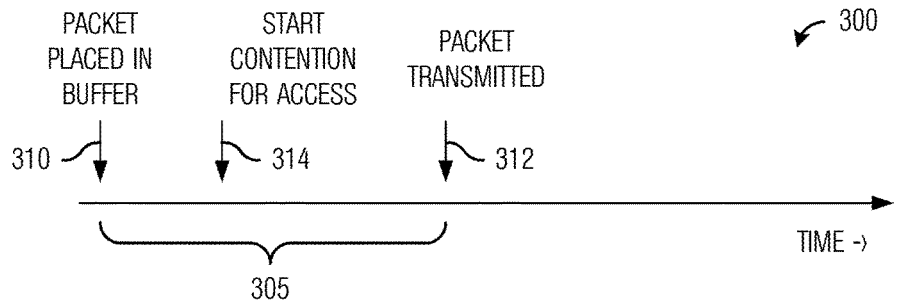
FIG. 3a illustrates an example timing diagram of a first type of packet delay according to example embodiments described herein.

FIG. 3a illustrates a timing diagram 300 of a first type of packet delay. The first type of packet delay may be referred to as injection delay and is the time that starts when a packet is ready for transmission to the time when the packet is injected into the communications system. Timing diagram 300 provides a graphical illustration of an injection delay 305. Injection delay 305 may begin when the packet is placed in a transmission buffer (shown as event 310) and it may end when the packet is injected into the communications system on the communications channel (shown as event 312). In a WiFi communications system, injection delay 305 includes time spent contending for access to the communications channel (shown as event 314).

Figure 3B:
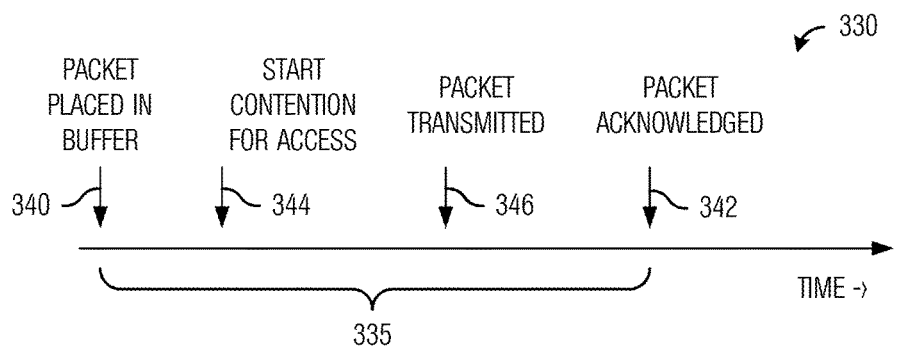
FIG. 3b illustrates an example timing diagram of a first form of a second type of packet delay according to example embodiments described herein.

FIG. 3b illustrates a timing diagram 330 of a first form of a second type of packet delay. The second type of packet delay may be referred to as packet delivery delay and is the time that starts when a packet is ready for transmission to the time when an acknowledgement corresponding to the packet is received. Timing diagram 330 provides a graphical illustration of an example of a first form of the packet delivery delay 335. First form of the packet delivery delay 335 may begin when the packet is placed in a transmission buffer (shown as event 340) and it may end when the acknowledgement corresponding to the packet is received (shown as event 342). It is noted that first form of the packet delivery delay 335 includes injection delay. In a WiFi communications system, first form of the packet delivery delay 335 includes time spent contending for access to the communications channel (shown as event 344). First form of the packet delivery delay 335 also includes the time when the packet is injected into the communications system on the communications channel (shown as event 346).

Figure 3C:
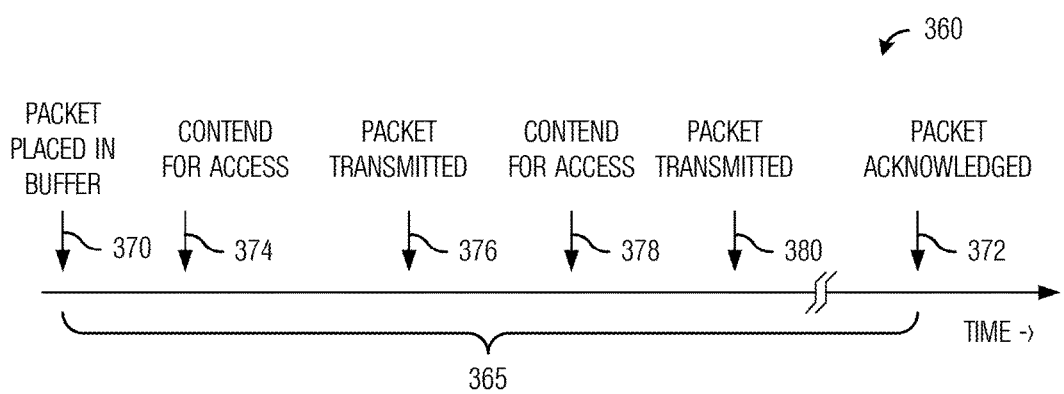
FIG. 3c illustrates an example timing diagram of a second form of the second type of packet delay according to example embodiments described herein.

FIG. 3c illustrates a timing diagram 360 of a second form of the second type of packet delay. In some circumstances, a packet may not be delivered successfully to its recipient. In such a situation, a negative acknowledgement may be received by the sender of the packet or no acknowledgement (either positive or negative) may be received by the sender. Timing diagram 360 provides a graphical illustration of an example of the second form of the packet delivery delay 365. Second form of the packet delivery delay 365 may begin when the packet is placed in a transmission buffer (shown as event 370) and it may end when the acknowledgement corresponding to the packet is received (shown as event 372). It is noted that second form of the packet delivery delay 365 includes injection delay. In a WiFi communications system, second form of the packet delivery delay 365 includes time spent contending for access to the communications channel (shown as event 374). Second form of the packet delivery delay 365 also includes a first time that the packet is transmitted (shown as event 376). However, the first time that the packet is transmitted resulted in a failure and the sender may or may not receive a negative acknowledgement. The sender attempts to re-transmit the packet (shown as events 378 and 380). The sender may re-attempt to re-transmit the packet until it receives the acknowledgement (shown as event 372).

In general, for a WiFi communications system, packet delay information may be implemented in several forms. As an example, it can be defined as the time duration between the time instant that the packet is ready for transmission and the time that it is transmitted, or the time for the station to contend for the channel, or number of retransmissions, or backoff interval, or duration of sensing and packet transmission, or duration for the transmission, and so on. As an alternative example, several factors may be combined into a value for packet delay, which may be defined as:

$$E(PD) = N_{retransmisson} * [E[backoff] + T_{tx_{collision}} + T_{wait\ after\ collision}] + (E[backoff] + T_{tx} + T_{sensing})$$

where E(PD) is the delay for a successful transmission, $N_{retransmission}$ is the number of retransmissions, $T_{sensing}$ is the sensing time (DIFS), E[backoff] is the backoff time, $T_{tx}$ is the data transmission time, $T_{tx_{collision}}$ is the time of transmission which collided with another packet, and $T_{wait\ after\ collision}$ is the time to wait for the detection of a collision. It is noted that before the packet is successfully transmitted, the packet may experience N collisions. Furthermore, each collision may have associated with it $T_{sensing}$ and E[backoff]. It is also noted that the example expressions of packet delay are for illustrative purposes only, and there can be other contents, formats, and structures for the delay information, all of which are encompassed by embodiments disclosed herein.

Figure 4:
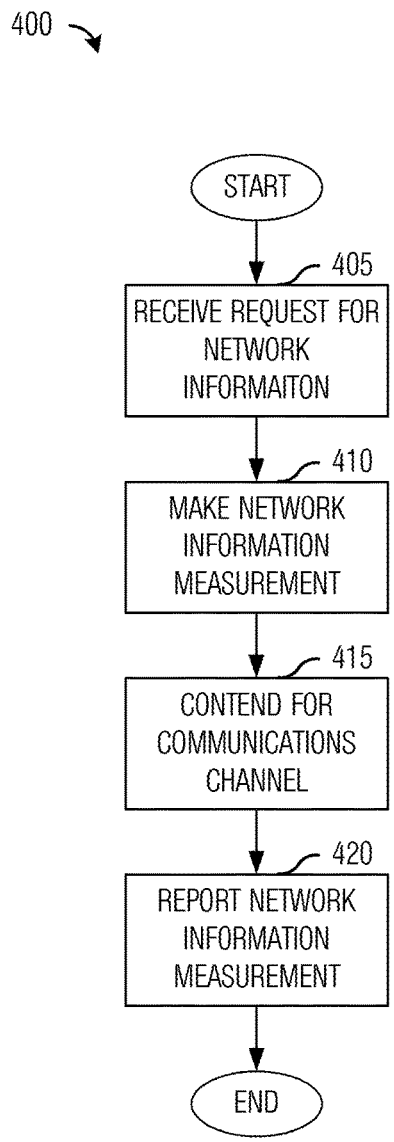
FIG. 4 illustrates an example flow diagram of operations in a station as the station measures and reports network information according to example embodiments described herein.

FIG. 4 illustrates a flow diagram of operations 400 in a station as the station measures and reports network information. Operations 400 may be indicative of operations occurring in a station, for example, a non-access point station as described previously, as the station measures network information, such as packet delay, and reports the network information. The station as used herein may be referred to as a measuring station.

Operations 400 may begin with the station receiving a request for network information (block 405). As discussed previously, the network information may be in the form of a measurement request for a packet delay (such as an injection delay, packet delivery delay, a number of retransmissions, number of transmission attempts, and the like). According to an example embodiment, the request may be received in the form of a measurement request element that is part of a management request frame. As an example, the request may be transmitted in a beacon. As another example, the request may be unicast to a single station, multiple stations, a type of stations, a group of stations, and the like. As an example, the request may be sent by a requesting device, such as an access point. As another example, the requesting device is a network entity that performs QoS control, e.g., sets the QoS restrictions. As another example, the requesting device is a peer station.

Figure 5A:
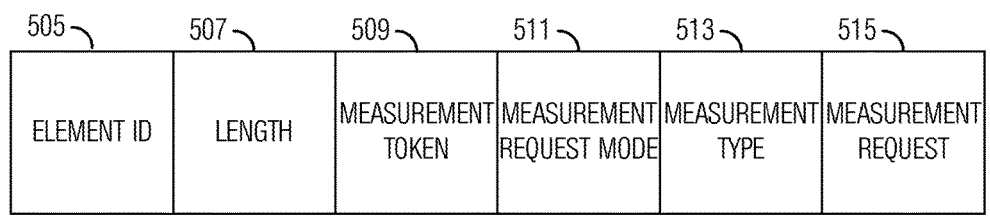
FIG. 5a illustrates an example measurement request element according to example embodiments described herein.

FIG. 5a illustrates a measurement request element 500. Measurement request element 500 may be a part of a management request frame and may include multiple fields, such as the type of traffic for which delay is requested, the time interval for collecting delay measurements, the type of processing (average, variance, mode) requested, the number of packets for which the delay is collected, etc. The fields may include an element identifier 505 to identify the element as a measurement request element, a length 507 to denote the length of measurement request element 500, a measurement token 509 to identify the request ID and the response ID in order to pair them, and a measurement request mode 511 to signify if the measurements takes place over a time interval or a number of packet or if the measurement value is above (or below) a specified threshold. The fields may also include a measurement type 513 to indicate the delay definition used i.e. the delay in the queue until transmission or the delay until the successful transmission (including retransmissions) and a measurement request 515 to signify the type of traffic to be measured (specific type traffic or all traffic packets).

Referring back now to FIG. 4, according to an example embodiment, the request for network information may be a singular request, meaning that the station may provide the network information requested one time in response to receiving the request for network information. According to an alternative example embodiment, the request for network information may set up multiple reports of network information. As an illustrative example, the request for network information may request that the station periodically report the network information. As an illustrative example, the request for network information may request that the station report the network information at specified times. As an illustrative example, the request for network information may request that the station report the network information when the network information meets a threshold (e.g., the packet delay is above a first threshold, the packet delay is below a second threshold, the packet delay changed from a previously measured packet delay by more than a third threshold, and the like). The request for network information may also specify a type of traffic to measure, a minimum number of packets to measure, and the like. In general, the information specified in the request for network information may be referred to as measurement criterion. It is noted that the above examples are for illustrative purposes only and are not meant to limit the scope or the spirit of the example embodiments.

The station may make the measurement of the network information as requested (block 410). As an example, the station may measure packet delay of a packet(s) that it is transmitting. It is noted that the station may have to wait until it is able to transmit before it can make the measurement. The station may have stored packet delays of packets that it has previously transmitted but which have not been requested to make reports on and the station may report the stored packet delays if the packet delays are sufficiently recent or are adequately stable.

In a WiFi communications system, the station may need to contend for channel access (block 415). The contention process for channel access may be as described in FIG. 1.

The station may report the network information as requested (block 420). The station may report the network information to the access point, the network entity responsible for QoS control, another station operating within the coverage area of the access point (i.e., a peer station), and the like. The network information may be reported to the access point, the network entity, the peer station, and the like, so that they may perform QoS control. As an example, a station reports the information to an access point (or vice versa) in WiFi, or a mobile station reports the information to a base station in a cellular communications system. The network information may be provided in a measurement report element that is part of a management frame.

Figure 5B:
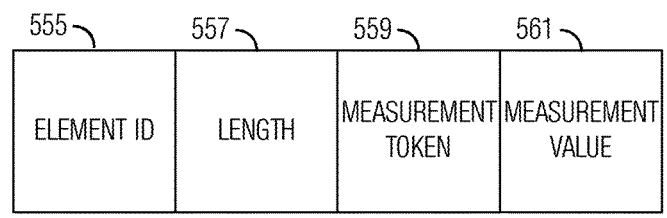
FIG. 5b illustrates an example measurement report element according to example embodiments described herein.

FIG. 5b illustrates a measurement report element 550. Measurement report element 550 may be a part of a management frame and may include multiple fields, such as the type of traffic for which delay is requested, the time interval for collecting delay measurements, the type of processing (average, variance, mode) requested, the number of packets for which the delay is collected, etc. . . . . The fields may include an element identifier 555 to identify the element as a measurement request element, a length 557 to denote the length of measurement report element 550, a measurement token 559 to indicate the request ID and the response ID in order to pair them, and a measurement value field 561 to report the measurement. In order to reduce signaling overhead, it may be possible to reduce the length of an association identity (AID) field or alternatively remove the entire AID field.

Referring back now to FIG. 4, according to an example embodiment, the network information may be inserted in a transmitted packet. As an example, the network information may be inserted in the MAC header of the transmitted packet. As another example, the network information may be inserted in the PHY header, the payload, piggybacked with the payload, and the like. According to an example embodiment, the network information may be reported in every packet transmitted, which may indicate the network information for the transmission of corresponding packets. According to an alternative example embodiment, the network information may be reported in one packet for every several packets (i.e., the network information is not reported in every packet), wherein the network information may be represented as an average of several packets. According to an alternative example embodiment, the network information may be reported if it is different from a previously reported network information.

According to an example embodiment, the network information may be represented in a variety of ways. As an illustrative example, the network information may be reported as an actual value. For example, the packet delay may be reported as the actual delay value. As another illustrative example, the network indication may be reported as an indicator. For example, the packet delay may be reported as a one or more bit indicator that indicates if the packet delay is higher or lower than a threshold and perhaps by how much. For example, there may be four levels of threshold, and when the delay is bigger than the first level of threshold and less than the second level of threshold, the indicator is set to value of 0B00 (binary); when the delay is bigger than the second level of threshold and less than the third level of threshold, the indicator is set to value of 0B01 (binary), and so on.

The receiver of the network information may use of the network information to judge channel condition and perform QoS control. As an example, when the packet delay is large, the receiver of the network information may determine that the channel is busy and may perform admission control and/or load balancing to avoid further degradation of the channel. The receiver of the network information may use an algorithm to determine if the channel is sufficiently busy to perform QoS control. As an example, the access point may estimate the network load situation, e.g., the communications system is heavily loaded if it observes that a large number of stations report large packet delays, and determine that admission control and/or load balancing are needed to reduce communications system congestion. The access point may broadcast information that indicates the communications system cannot accept any new association (or information indicating how many new associations are available in the communications system). As an alternative example, the station may ask the access point whether it can create a new traffic flow, and the access point determines an answer and replies with a message telling the station whether it can create a new traffic flow (e.g., the stations sends a query in a management frame and the access point replies with a response in another management frame). As an alternative example, the access point may perform admission control by rejecting a new flow from establishing from a station. As an alternative example, the access point may perform load balancing by asking some stations to transfer their association to other basic service set.

Figure 6:
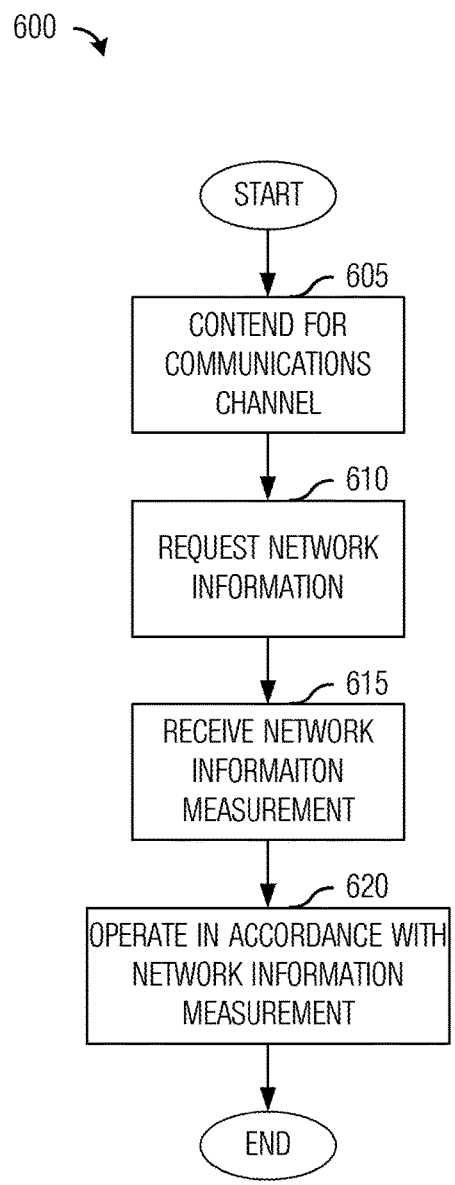
FIG. 6 illustrates an example flow diagram of operations in a requesting device as the requesting device requests network information according to example embodiments described herein.

FIG. 6 illustrates a flow diagram of operations 600 in a requesting device as the requesting device requests network information. Operations 600 may be indicative of operations occurring in a requesting device, such as an access point, a network entity, a peer station, and the like, as the requesting device requests network information from one or more stations.

Operations 600 may begin with the requesting device contending for access to a communications channel (block 605). Generally, in a WiFi communications system, access to the communications channel is needed prior to transmitting.

The requesting device may request network information (block 610). As an example, the requesting device may send a measurement request. According to an example embodiment, the request may be transmitted in the form of a measurement request element that is part of a management request frame. As an example, the request may be transmitted in a beacon. As another example, the request may be unicast to a single station, multiple stations, a type of stations, a group of stations, and the like. As an example, the request may be sent by an access point. As another example, the request may be sent by a network entity that performs QoS control, e.g., sets the QoS restrictions, or control admissions of new users. As discussed previously, the network information may be a packet delay (such as an injection delay, packet delivery delay, a number of retransmissions, a number of transmission attempts, and the like).

According to an example embodiment, the request for network information may be a singular request, meaning that the station may provide the network information requested one time in response to receiving the request for network information. According to an alternative example embodiment, the request for network information may set up multiple reports of network information. As an illustrative example, the request for network information may request that the station periodically report the network information. As an illustrative example, the request for network information may request that the station report the network information at specified times or periodically or non-periodically. As an illustrative example, the request for network information may request that the station report the network information when the network information meets a threshold (e.g., the packet delay is above a first threshold, the packet delay is below a second threshold, the packet delay changed from a previously measured packet delay by more than a third threshold, and the like). In another example, the request for network information may request that the station report the network information every certain seconds or minutes in a periodical fashion, or after the station measures a certain number of packets in a non-periodically fashion. It is noted that the above examples are for illustrative purposes only and are not meant to limit the scope or the spirit of the example embodiments.

The requesting device may receive the network information (block 615). The network information may be received in a measurement report element that is part of a management frame.

The requesting device may operate in accordance with the network information (block 620). The requesting device may use of the network information to judge channel condition and perform QoS control. As an example, when the packet delay is large, the requesting device may determine that the channel is busy and may perform admission control and/or load balancing to avoid further degradation of the channel. The requesting device may use an algorithm to determine if the channel is sufficiently busy to perform QoS control. As an example, the requesting device may estimate the network load situation, e.g., the communications system is heavily loaded if it observes that a large number of stations report large packet delays, and determine that admission control and/or load balancing are needed to reduce communications system congestion. The requesting device may broadcast information that indicates the communications system cannot accept any new association (or information indicating how many new associations are available in the communications system). As an alternative example, the requesting device may perform admission control by rejecting a new flow from establishing from a station. As an alternative example, the requesting device may perform load balancing by asking some stations to transfer their association to other basic service set. As an alternative example, the requesting device may reduce a data rate of an existing flow(s) if the packet delay is large. As an alternative example, the requesting device may increase a data rate of an existing flow(s) if the packet delay is small. As an alternative example, the requesting device may allow additional associations if the packet delay is small. As an alternative example, the requesting device may disallow additional associations if the packet delay is large.

Figure 7:
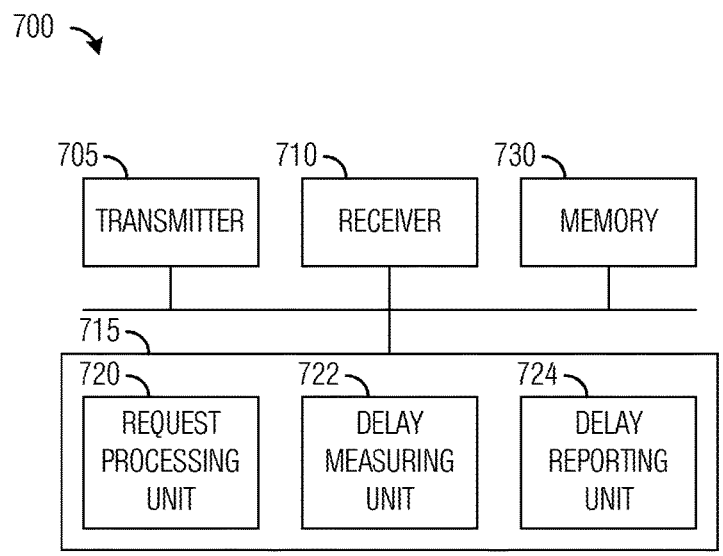
FIG. 7 illustrates an example first communications device according to example embodiments described herein.

FIG. 7 illustrates a first communications device 700. Communications device 700 may be an implementation of a device, such as an access point, a station, and the like, that reports network information. Communications device 700 may be used to implement various ones of the embodiments discussed herein. As shown in FIG. 7, a transmitter 705 is configured to send network information, packets and/or signals and a receiver 710 is configured to receive requests, packets and/or signals. Transmitter 705 and receiver 710 may have a wireless interface, a wireline interface, or a combination thereof.

A request processing unit 720 is configured to process received requests for network information. Request processing unit 720 is configured to determine network information type, reporting frequency, reporting times, reporting thresholds, type of traffic, minimum number of packets to measure, and the like. A delay measuring unit 722 is configured to measure network information as requested, such as packet delay. A delay reporting unit 724 is configured to generate network information to be reported. Delay reporting unit 724 is configured to determine when to report network information, e.g., times corresponding to specified reporting frequency, when a threshold is met so that network information is to be reported, and the like. A memory 730 is configured to store requests, network information, measured information, reports, and the like.

The elements of communications device 700 may be implemented as specific hardware logic blocks. In an alternative, the elements of communications device 700 may be implemented as software executing in a processor, controller, application specific integrated circuit, or so on. In yet another alternative, the elements of communications device 700 may be implemented as a combination of software and/or hardware.

As an example, transmitter 705 and receiver 710 may be implemented as a specific hardware block, while request processing unit 720, delay measuring unit 722, and delay reporting unit 724 may be software modules executing in a processor 715, a microprocessor, a custom circuit, or a custom compiled logic array of a field programmable logic array. Request processing unit 720, delay measuring unit 722, and delay reporting unit 724 may be stored as modules in memory 730.

Figure 8:
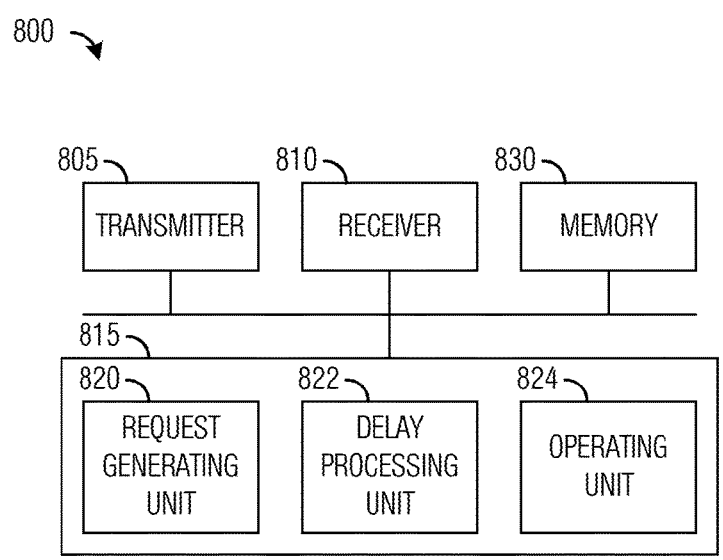
FIG. 8 illustrates an example second communications device according to example embodiments described herein.

FIG. 8 illustrates a second communications device 800. Communications device 800 may be an implementation of a device, such as an access point, a station, and the like, that receives network information. Communications device 800 may be used to implement various ones of the embodiments discussed herein. As shown in FIG. 8, a transmitter 805 is configured to send requests, packets and/or signals and a receiver 810 is configured to receive network information, packets and/or signals. Transmitter 805 and receiver 810 may have a wireless interface, a wireline interface, or a combination thereof.

A request generating unit 820 is configured to generate requests for network information. Request generating unit 820 is configured to determine network information type, reporting frequency, reporting times, reporting thresholds, and the like, and generate an appropriate request. A delay processing unit 822 is configured to process received network information, such as packet delay. Delay processing unit 822 is configured to generate network information values, such as packet delays, from indicators, change values, and the like. An operating unit 824 is configured to operate communications device 800 in accordance with the network information, such as, adjust QoS control in accordance with the network information. A memory 830 is configured to store requests, network information, measured information, reports, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, transmitter 805 and receiver 810 may be implemented as a specific hardware block, while request generating unit 820, delay processing unit 822, and operating unit 824 may be software modules executing in a processor 815, a microprocessor, a custom circuit, or a custom compiled logic array of a field programmable logic array. Request generating unit 820, delay processing unit 822, and operating unit 824 may be stored as modules in memory 830.

Although the present disclosure and its advantages have been described in detail, it should be understood that various changes, substitutions and alterations can be made herein without departing from the spirit and scope of the disclosure as defined by the appended claims.

What is claimed is:

1. A method for measuring delay in a wireless fidelity (WiFi) network, the method comprising:
    measuring, by a non-access point measuring station, a delay associated with transmission of a packet through the WiFi network in response to a measurement request from a requesting device, wherein the delay is given by:

$$E(PD)=N_{retransmisson}*[E[\text{backoff}]+T_{tx_{collision}}+T_{wait\ after\ collision}]+(E[\text{backoff}]+T_{tx}+T_{sensing}),$$

where $E(PD)$ is a delay for a successful transmission, $N_{retransmission}$ is a number of retransmissions, $T_{sensing}$ is a sensing time, $E[\text{backoff}]$ is a backoff time, $T_{tx}$ is a data transmission time, $T_{tx_{collision}}$ is a time of transmission which collided with another packet, and $T_{wait\ after\ collision}$ is a time to wait for a detection of a collision;
    contending, by the non-access point measuring station, for access to a communications channel of the WiFi network after measurement of the delay; and
    transmitting, by the non-access point measuring station, the delay as measured to the requesting device using the communications channel after a successful contention.

2. The method of claim 1, wherein the requesting device comprises an access point of the WiFi network serving the non-access point measuring station.

3. The method of claim 1, wherein the requesting device and the non-access point measuring station are served by an access point.

4. The method of claim 1, wherein the retransmission time is a function of a number of retransmissions and a sum of a backoff time of a retransmission, a time of a retransmission that collided with another packet and a time to wait for a detection of a collision.

5. The method of claim 1, wherein the delay is transmitted to a recipient, and wherein the method further comprises transmitting the delay to the recipient in accordance to a transmission criterion.

6. The method of claim 5, wherein the measurement request includes the transmission criterion.

7. The method of claim 5, wherein the transmission criterion comprises at least one of a reporting frequency, a reporting time, a reporting threshold, a type of traffic, a minimum number of packets measured, and a change threshold.

8. The method of claim 1, wherein the requesting device comprises a peer station.

9. The method of claim 1, wherein the request comprises a measurement request element.

10. A method for requesting a delay measurement in a wireless fidelity (WiFi) network, the method comprising:
    transmitting, by a requesting device, a request to a non-access point measuring station, the request for a measurement of a delay associated with a transmission of a packet by the non-access point measuring station;
    receiving, by the requesting device, a measured delay from the non-access point measuring station, wherein the measured delay is given by:

$$E(PD)=N_{retransmisson}*[E[\text{backoff}]+T_{tx_{collision}}+T_{wait\ after\ collision}]+(E[\text{backoff}]+T_{tx}+T_{sensing}),$$

where $E(PD)$ is a delay for a successful transmission, $N_{retransmission}$ is a number of retransmissions, $T_{sensing}$ is a sensing time, $E[\text{backoff}]$ is a backoff time, $T_{tx}$ is a data transmission time, $T_{tx_{collision}}$ is a time of transmission which collided with another packet, and $T_{wait\ after\ collision}$ is a time to wait for a detection of a collision; and
    operating, by the requesting device, responsive to the measured delay.

11. The method of claim 10, wherein operating responsive to the measured delay comprises at least one of adjusting admission control for a new station in accordance to the measured delay, balancing a load at a station in accordance to the measured delay, and adjusting a data rate for an existing station in accordance to the measured delay.

12. The method of claim 10, wherein the request is transmitted to a plurality of stations including the non-access point measuring station.

13. The method of claim 10, wherein the request is transmitted to a plurality of stations of a single type including the non-access point measuring station.

14. The method of claim 10, wherein the request is transmitted in a management request frame.

15. The method of claim 14, wherein the request is a measurement request element.

16. The method of claim 10, wherein the request is transmitted in a beacon.

17. The method of claim 10, wherein the request is transmitted on a communications channel, and wherein the method further comprises contending for access to the communications channel.

18. A non-access point measuring station comprising:
    a processor of the non-access point measuring station configured to:
        measure a delay associated with transmission of a packet through a wireless fidelity (WiFi) network in response to a measurement request from a requesting device, wherein the delay is given by:

$$E(PD)=N_{retransmisson}*[E[\text{backoff}]+T_{tx_{collision}}+T_{wait\ after\ collision}]+(E[\text{backoff}]+T_{tx}+T_{sensing}),$$

where $E(PD)$ is a delay for a successful transmission, $N_{retransmission}$ is a number of retransmissions, $T_{sensing}$ is a sensing time, $E[\text{backoff}]$ is a backoff time, $T_{tx}$ is a data transmission time, $T_{tx_{collision}}$ is a time of transmission which collided with another packet, and $T_{wait\ after\ collision}$ is a time to wait for a detection of a collision; and
        contend for access to a communications channel of the WiFi network after measurement of the delay; and
    a transmitter operatively coupled to the processor, the transmitter configured to transmit the delay as measured to the requesting device using the communications channel after a successful contention.

19. The non-access point measuring station of claim 18, further comprising a receiver operatively coupled to the processor, the receiver configured to receive the measurement request from an access point serving the non-access point measuring station.

20. The non-access point measuring station of claim 18, further comprising a receiver operatively coupled to the processor, the receiver configured to receive the measurement request from a requesting station, wherein the requesting station and the non-access point measuring station are served by an access point.

21. The non-access point measuring station of claim 18, wherein the transmitter is configured to transmit the delay to a recipient in accordance to a measurement criterion.

22. A requesting device comprising:
a transmitter configured to transmit a request to a non-access point measuring station, the request for a measurement of a delay associated with a transmission of a packet by the non-access point measuring station;
a receiver configured to receive a measured delay from the non-access point measuring station, wherein the measured delay is given by:

$$E(PD)=N_{retransmisson}*[E[backoff]+T_{tx_{collision}}+T_{wait\ after\ collision}]+(E[backoff]+T_{tx}+T_{sensing}),$$

where E(PD) is a delay for a successful transmission, $N_{retransmission}$ is a number of retransmissions, $T_{sensing}$ is a sensing time, E[backoff] is a backoff time, $T_{tx}$ is a data transmission time, $T_{tx_{collision}}$ is a time of transmission which collided with another packet, and $T_{wait\ after\ collision}$ is a time to wait for a detection of a collision; and
a processor operatively coupled to the transmitter and to the receiver, the processor configured to operate responsive to the measured delay.

23. The requesting device of claim 22, wherein the processor is configured to contend for access to a communications channel used to transmit the request.

24. The requesting device of claim 22, wherein the request is transmitted in a management request frame.

25. The requesting device of claim 22, wherein the request is a measurement request element.

26. The requesting device of claim 22, wherein the request is transmitted in a beacon.

27. The requesting device of claim 22, wherein the processor is configured to adjust admission control for a new station in accordance to the measured delay, to balance a load at a station in accordance to the measured delay, and to adjust a data rate for an existing station in accordance to the measured delay.

* * * * *